Nov. 12, 1963 R. T. HUBBARD 3,110,115
SPIRIT LEVEL

Filed Sept. 5, 1961 3 Sheets-Sheet 1

RICHARD T. HUBBARD
INVENTOR

BY Kimmel & Crowell
ATTORNEYS.

Nov. 12, 1963   R. T. HUBBARD   3,110,115
SPIRIT LEVEL
Filed Sept. 5, 1961   3 Sheets-Sheet 2
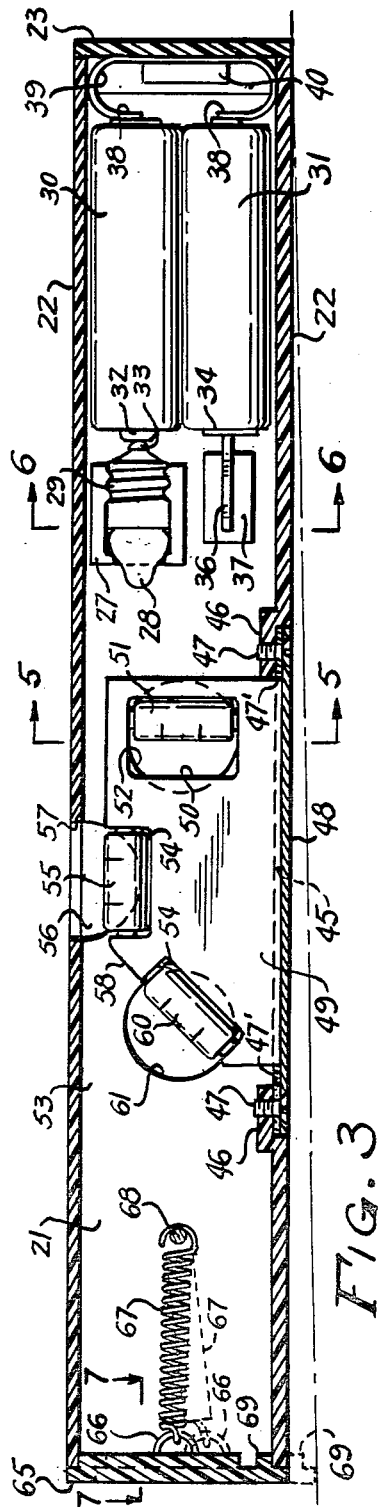
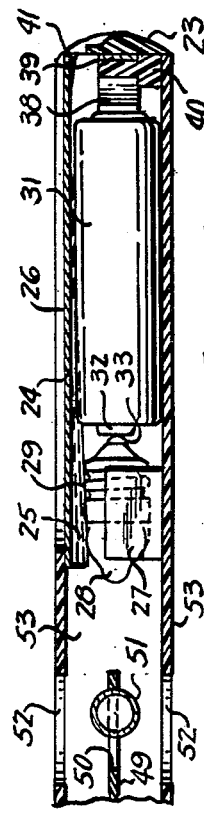
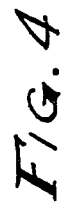
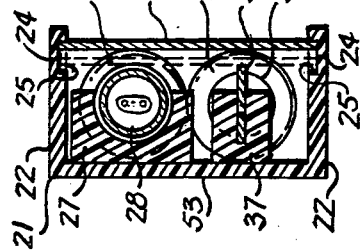
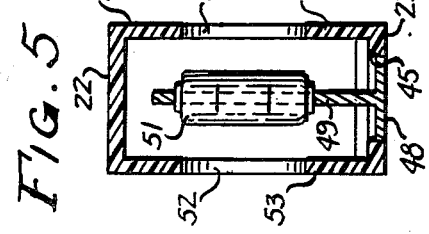
RICHARD T. HUBBARD
INVENTOR
BY Kimmel & Crowell
ATTORNEYS.

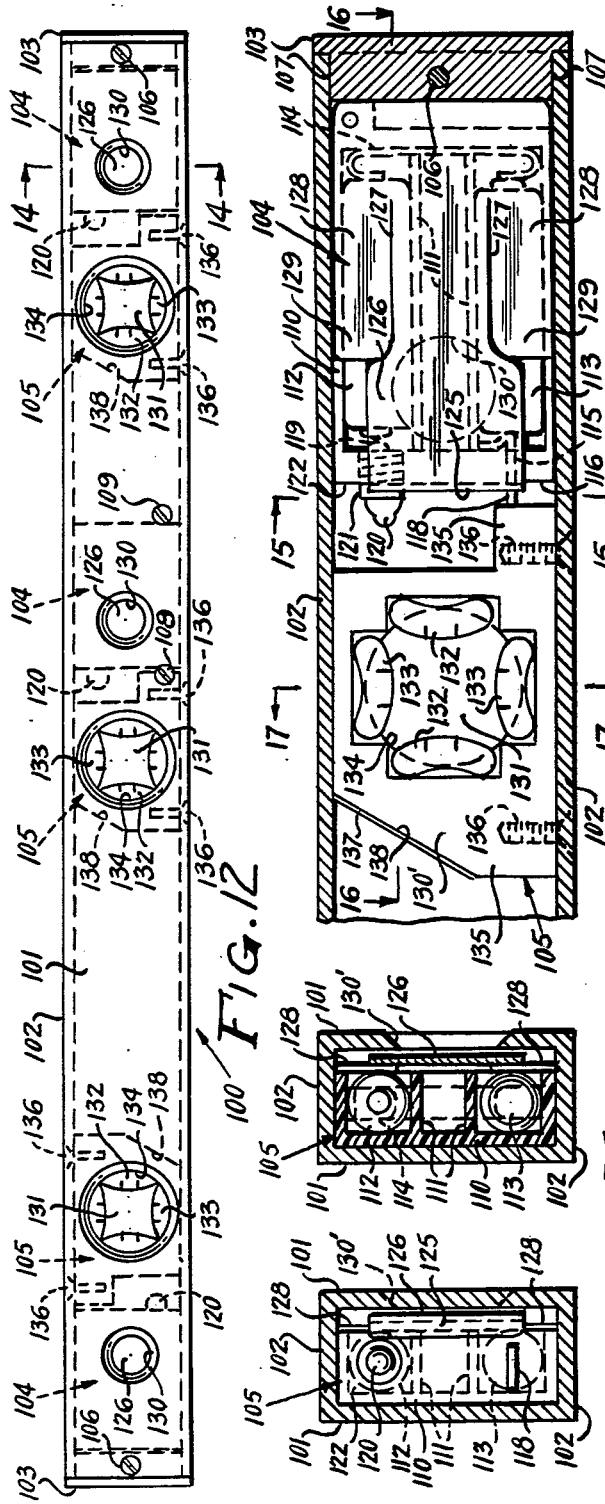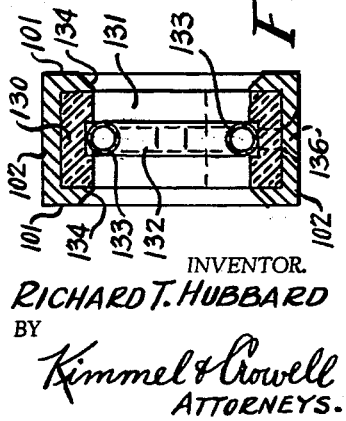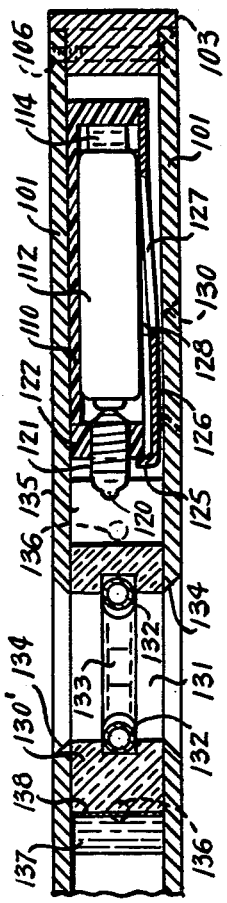

United States Patent Office

3,110,115
Patented Nov. 12, 1963

3,110,115
SPIRIT LEVEL
Richard T. Hubbard, 13418 E. 15th, Spokane, Wash.
Filed Sept. 5, 1961, Ser. No. 136,417
4 Claims. (Cl. 33—214)

This invention relates to a spirit level and has as its primary object the provision of an improved spirit level characterized by means whereby the spirit vials carried thereby may be illuminated for reading in the dark.

An additional object of the invention comprises the provision of a spirit level of this character which constitutes an improvement over my co-pending application, Patent No. 3,003,054, filed September 9, 1960, entitled "Illuminated Spirit Level."

An additional object of the invention resides in an improved illuminating unit which may be inserted in and removed from the level as a unit for replacement of batteries or bulbs or the like.

An additional object of the invention resides in the provision of an improved spirit level vial assembly which may be also removed from the level as a unit for replacement of broken vials or the like.

A further specific object of the invention resides in the provision of an improved means for indicating angularity of the level relative to a surface being measured in order to compensate for an angularly disposed surface.

Still another object of the invention resides in the provision of an improved level vial insert characterized by a mirrored surface which reflects light, thus reducing loss of illumination.

A further specific object of the invention is the provision of a device of this character whereby means are provided for the elimination of glare from the illuminating source in the vial insert.

Still another object of the invention resides in a device of this character which is sturdy and durable in construction, reliable and efficient in operation, and relatively simple and inexpensive to manufacture and assemble.

Still other objects reside in the combinations of elements, arrangements of parts, and features of construction, all as will be more fully pointed out hereinafter and disclosed in the accompanying drawings wherein:

FIGURE 1 is a side elevational view of one form of level embodying elements of the instant inventive concept, certain concealed parts thereof being indicated in dotted lines.

FIGURE 2 is a top plan view of the device of FIG. 1, certain concealed parts thereof being indicated in dotted lines.

FIGURE 3 is an enlarged sectional view taken substantially along the line 3—3 of FIG. 2 as viewed in the direction indicated by the arrows.

FIGURE 4 is an enlarged sectional view taken substantially along the line 4—4 of FIG. 1 as viewed in the direction indicated by the arrows, parts thereof being broken away.

FIGURE 5 is a sectional view taken substantially along the line 5—5 of FIG. 3 as viewed in the direction indicated by the arrows.

FIGURE 6 is a sectional view taken substantially along the line 6—6 of FIG. 3 as viewed in the direction indicated by the arrows.

FIGURE 7 is a fragmentary sectional view taken substantially along the line 7—7 of FIG. 3 as viewed in the direction indicated by the arrows.

FIGURES 8, 9, 10, and 11 are fragmentary side elevational views, concealed parts being indicated in dotted lines, of a modified form of end construction shown in different positions of adjustment.

FIGURE 12 is a side elevational view of a modified form of level constructed in accordance with the instant invention.

FIGURE 13 is an enlarged fragmentary, vertical, sectional view of the portion of the structure shown in FIG. 12.

FIGURE 14 is an enlarged sectional view taken substantially along the line 14—14 of FIG. 12 as viewed in the direction indicated by the arrows.

FIGURE 15 is a sectional view taken substantially along the line 15—15 of FIG. 13 as viewed in the direction indicated by the arrows.

FIGURE 16 is a sectional view taken substantially along the line 16—16 of FIG. 13 as viewed in the direction indicated by the arrows; and FIGURE 17 is a sectional view taken substantially along the line 17—17 of FIG. 13 as viewed in the direction indicated by the arrows.

Similar reference characters refer to similar parts throughout the several views of the drawings.

Having reference now to the drawings in detail, and more particularly to FIGS. 1 to 7, inclusive, there is shown as generally indicated at 20 a small hand level which is preferably constructed of plastic or the like, although metal may be employed, and which constitutes a hollow casing 21. The casing includes side walls 22, and an end wall 23 and at one end is open at the top. The side wall 22 are longitudinally grooved as at 24 adjacent the open top, the grooves tapering into an enlarged portion 25 (see FIG. 6) adjacent the end of the open portion. A metallic plate 26 is slidably mounted in grooves 25 and is adapted to be pressed inwardly in the enlarged portions 25 for a purpose to be more fully described hereinafter. Immediately underlying the enlarged portions 25 of the grooves is a block 27 of insulating material in which is seated a flashlight bulb 28 having a metal end cap 29, the bulb being of any conventional desired configuration, and offset from the center of the level. A pair of batteries 30 and 31 are positioned in the level in opposite relation in conventional manner with the positive terminal 32 of battery 30 contacting the positive terminal 33 of bulb 28. The negative terminal 34 of battery 31 is in contact with a metal plate 36 which extends outwardly as best shown in FIG. 6 to a point adjacent the lower extermities of the enlarged portions 25 of grooves 24 so that it may be contacted by the metal plate 26 when the latter is pressed downwardly. The plate 36 is set in an insulating block 37. The opposite terminals of the batteries 30 and 31 are contacted by the ends 38 of an arcuate resilient spring 39 which has its bight or central section held in an insulating block 40 which is secured to the end plate 23 of the level.

As best seen in FIG. 4, the ends of grooves 24 are enlarged as at 41 adjacent end portion 23, so that the plate 26 may when desired be entirely removed for replacement of the batteries or bulb.

It will now be seen that when the plate 26 is pressed downwardly a circuit is closed between the metal plate 36 and the light 29, which serves to illuminate the bulb.

Forwardly of the bulb 28 and positioned near the center of the level is an opening 45 in one of the side walls of the level which is provided with recessed end portions 46 which are apertured to receive holding screws 47 which secure in position a closure plate 48, suitable washers 47' being interposed between the plate and the offsets or recesses. Integrally formed with or secured to plate 48 is a perpendicular plate 49 which is provided adjacent one end with a recess 50 which contains a level 51. The level 51 is directly in the path of illumination of the bulb 28 and is rendered visible through openings 52 in the opposite walls 53 of the level. A cutaway portion 54 on the top edge of plate 49 accommodates a second bubble level 55 which is perpendicular or at right angles to the level 51, and which is visible through openings 56 in side walls 21 or openings 57 in the adjacent top wall 22.

The opposite edge of plate 49 is cut at an angle as indicated at 58 and recessed at at 59 to accommodate a third bubble level 60 set at a 45° angle relative to both the levels 55 and 51, and which is visible through side openings 61, the arrangement thus being such that any of the levels 55, 51 or 60 are illuminated by the bulb 28 and all are visible through related openings in the side walls and the level may be used in substantially any position of adjustment.

The end of the hollow level opposite end plate 23 is closed by an end plate 65, which has on its inner surface an eye 66 to which is attached a spring 67, the other end of which is secured to a pin 68 for holding the end cap in closed position. When in normally closed position as indicated in full lines in FIGS. 1 and 3, the ends of the plate 65 are flush with the walls 22. A rib 69 is provided immediately above the bottom edge of the plate 65, and when the rib is moved to the position indicated in dotted lines in FIG. 3, that end of the level is elevated approximately ¼ of an inch. By virtue of this arrangement services which are off level may be readily leveled by means of the bubble level 55, to an accuracy within a quarter of an inch within the length of the rule. It is noted that as best shown in FIG. 7, the end cap 65 is recessed as at 70 to form shoulders which extend between the walls 21 for alignment thereof when in either extended or retracted position.

FIGS. 8 to 11 disclose a modified form of end construction wherein the end 71 is solid and takes the place of the movable end cap 75. In this modification an eccentric 76 is swivelly mounted on a pin 77 between the walls 21, and when in the position shown in FIG. 8, is in alignment with a slot 79 in the lower wall 22. When in this position the ruler may be absolutely level. However, when one eccentrically positioned face 80 is extended through the slot 79, the end of the level is raised ⅛ of an inch which is indicated by the pointer 82 on the side of the rule adjacent the rotatable disk 83 which is suitably marked with appropriate indicia. When the eccentric is turned so that the face 84 extends through the slot 79 as shown in FIG. 10, that end of the rule is raised ¼ of an inch, and when the face 85 is extended through the slot as shown in FIG. 11, the end of the rule is raised ⅜ of an inch.

A further modified form of level is shown in FIGS. 12 to 17, inclusive, and includes an elongated hollow level generally indicated at 100 which includes side walls 101, edge walls 102, and closed end caps 103. This unit may include a plurality, as illustratively, three illuminating units, each generally indicated at 104, and to be more fully described hereinafter, and a corresponding plurality of level units, each generally indicated at 105 and to be more fully described hereinafter.

Access may be had to either of the end battery units by removal of the end plug 103, which is held in position by screws 106, and provided with an internal shoulder 107 for proper alignment thereof interiorly of the device, while access may be had to the central battery assembly by removal of the side plate 108 held in position by screws 109. Obviously, more than three units may be employed if desired, or the general principles of the invention may be incorporated in a single unit in a shorter level.

Referring first to the battery and bulb unit generally indicated at 104, the same is comprised of a generally rectangular plastic casing 110, which may be comprised of clear plastic, or of any suitable insulating material which is provided with a pair of central partitions 111, on opposite sides of which are positioned batteries 112 and 113 arranged in opposite relation. The ends of the batteries are contacted by a U-shaped spring member 113 which is held in position by the ends of the partitions 114. The opposite end of the battery 113 has its terminal in contact with a metallic plate 115, which is suitably held in position in the plastic, and which extends outwardly through a slot in the end wall 116 of the plastic casing and is exposed as at 118 (see FIG. 13). The terminal of the opposite battery 112 is in contact with the end 119 of a flashbulb 120, the end 121 of which also extends outwardly beyond the casing end 122, as best shown in FIG. 16.

A circuit is adapted to be closed by a flange 125 forming a part of a plate 126, the flange, when the plate is pressed inwardly, serving to close the circuit between the exposed end 121 of bulb 120 and the exposed end 118 of metallic contact plate 115. Metallic plate 126 is provided with oppositely disposed longitudinally extending slots 127 which form spring ears 128 which bear against the adjacent wall 101 of the level casing, being provided with upturned end portions 129 which normally serve to bias the flange 125 out of contact.

Access to the plate 126 for the purpose of exerting pressure thereon is afforded through a suitable opening 130 in the adjacent side wall 101.

Having reference now to the level unit 105, the same is comprised of a block 130 preferably of clear, transparent plastic which has a central opening 131 therein. Oppositely disposed pairs of levels 132 extending vertically and 133 extending horizontally are positioned around the opening 131 and are visible through a circular opening 134 in the side walls 101 of the level. The block includes a pair of ears 135 extending at opposite ends thereof and is adapted to be inserted through the end of the level. Screws 136 serve to hold the unit in position. One corner 137 of the block 130 is cut at an angle, and has a silvered reflecting surface 138 thereon, the reflecting surface being located off center and in alignment with the light 120 so as to diffuse illumination evenly to all the levels 132 and 133. The arrangement is such that all of the levels are clearly illuminated in dark or shadowed places for ready visibility. The level is used in a conventional manner.

From the foregoing it will now be seen that there are herein provided improved illuminated levels which accomplish all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. An illuminated level comprising an elongated hollow level body, a bubble level assembly formed of an integral unit including a mounting member and a plurality of levels carried thereby insertable and removable from said body as a unit, a source of illumination in said body for illuminating said level assembly, and means of varying the effective height of an end of said level body, said last-mentioned means comprising an end plate, spring means holding said end plate to said body, and a spaced rib on said end plate adapted to be positioned under the lower edge of one end of said body to raise the height thereof.

2. An illuminated level comprising an elongated hollow level body, a bubble level assembly formed of an integral unit including a mounting member and a plurality of levels carried thereby insertable and removable from said body as a unit, and a source of illumination in said body for illuminating said level assembly, and means of varying the effective height of an end of said level body, said last-mentioned means including a rotatable eccentric extending through a slot in the undersurface of one end of said level, said eccentric having a plurality of flattened surfaces of different heights defined thereon, said surfaces adapted to be selectively extended through said slot.

3. A level comprising a level body having an end with a lower edge, a bubble level means disposed within said level body, and means for varying the effective height of said end of said level body, said last-mentioned means including an end plate, resilient means holding said end plate to said level body, and spaced rib means on said end plate adapted to be selectively positioned under said lower edge of said end of said level body.

4. A level comprising a level body having an end with a lower edge, a bubble level means disposed within said level body, and means for varying the effective height of said end of said level body, said last-mentioned means including a slot defined in said lower edge adjacent said end of said level body, an eccentric rotatably mounted within said level body, said eccentric having a plurality of flattened surfaces of different heights defined thereon, and said surfaces adapted to be selectively extended through said slot.

References Cited in the file of this patent

UNITED STATES PATENTS

| | | |
|---|---|---|
| 808,862 | McCain | Jan. 2, 1906 |
| 986,924 | L'Heureux | Mar. 4, 1911 |
| 1,583,489 | Perrine | May 4, 1926 |
| 2,607,882 | Arnold | Aug. 19, 1952 |
| 2,790,069 | Alexander | Apr. 23, 1957 |
| 2,806,133 | Aube | Sept. 10, 1957 |

FOREIGN PATENTS

| | | |
|---|---|---|
| 1,131,899 | France | Oct. 29, 1956 |